(12) United States Patent
Rodrigues

(10) Patent No.: US 6,418,036 B1
(45) Date of Patent: Jul. 9, 2002

(54) ELECTRICAL CONNECTION BOX HAVING A BREAK AWAY SHIELDING STRUCTURE

(76) Inventor: Leroy N. Rodrigues, 26161 Avenida Hortensia, Hemet, CA (US) 92544

( * ) Notice: Subject to any disclaimer, the term of this patent is extended or adjusted under 35 U.S.C. 154(b) by 0 days.

(21) Appl. No.: 09/776,367

(22) Filed: Feb. 2, 2001

Related U.S. Application Data

(60) Provisional application No. 60/190,958, filed on Mar. 21, 2000.

(51) Int. Cl.[7] ................................................ H05K 9/00
(52) U.S. Cl. ..................... 361/816; 361/818; 174/35 R; 174/50; 220/4.02
(58) Field of Search ................................. 361/800, 816, 361/818, 35 R; 174/50, 58; 220/4.02; 206/701

(56) References Cited

U.S. PATENT DOCUMENTS

| | | | | | |
|---|---|---|---|---|---|
| 4,605,139 A | * | 8/1986 | Dacar | .......................... | 220/3.4 |
| 4,760,496 A | * | 7/1988 | Koch | .......................... | 361/818 |
| 6,188,022 B1 | * | 2/2001 | He | ............................... | 174/58 |

* cited by examiner

Primary Examiner—Jayprakashi N. Gandhi
(74) Attorney, Agent, or Firm—Joseph N. Breaux

(57) ABSTRACT

An electrical connection box having a break away shielding structure that extends out past the perimeter edge of the connection box of a conventional connection box so as to prevent mudding over during sheet rock construction. The break away shielding structure is broken away from the electrical connection box by gripping and twisting the shielding structure to break off one or more portions of the shielding structure at a time with a pair of snips, pliers or other readily available electricians tool.

1 Claim, 3 Drawing Sheets

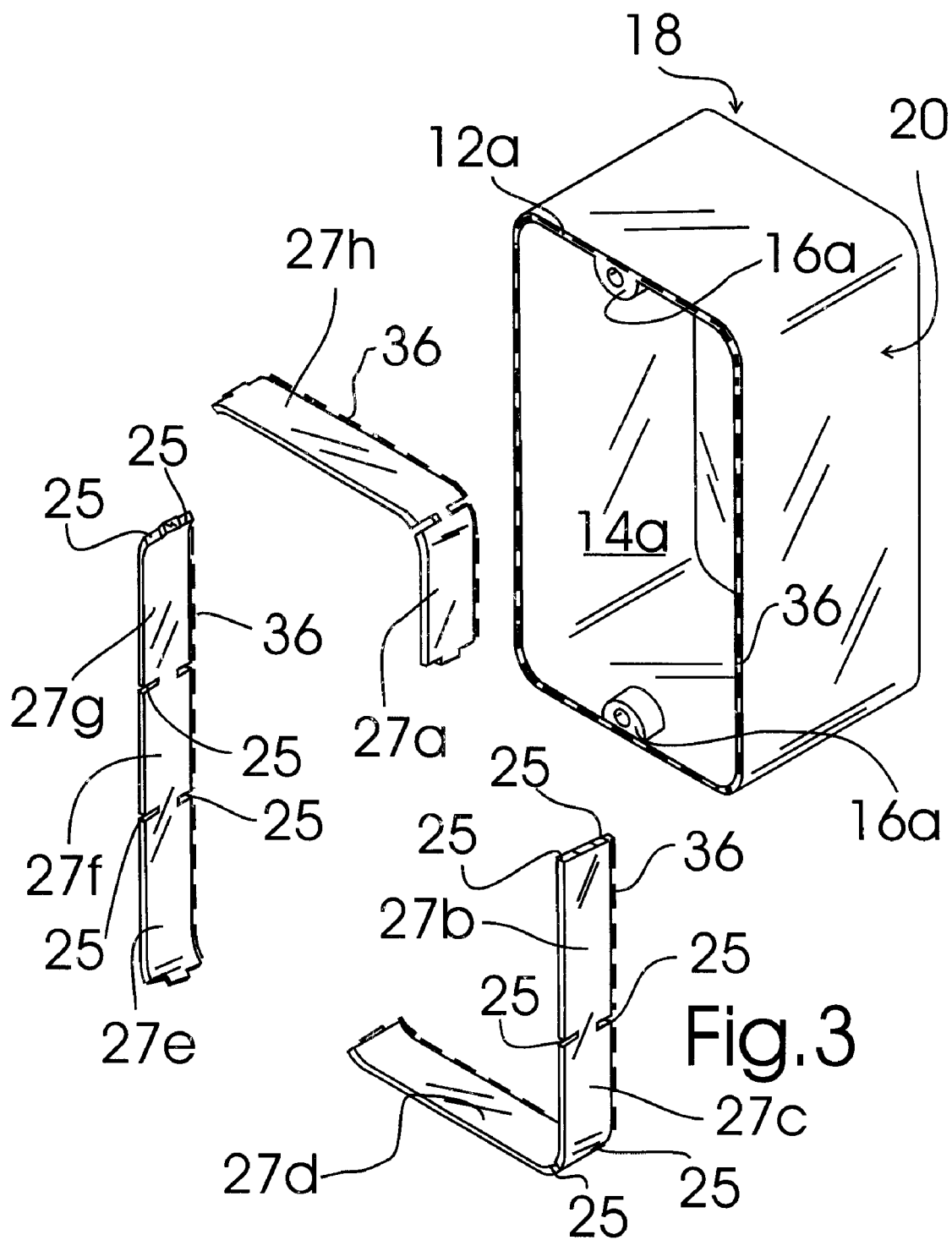

US 6,418,036 B1

ELECTRICAL CONNECTION BOX HAVING A BREAK AWAY SHIELDING STRUCTURE

This application claims benefit of No. 60/190,958 filed Mar. 21, 2000.

TECHNICAL FIELD

The present invention relates to electrical connection boxes and more particularly to an improved electrical connection box having a break away shielding structure that extends out past the perimeter edge of the connection box that defines the open front of the connection box and operates prior to removal to prevent mudding over of the open front of the connection box during sheet rock construction; the break away shielding structure being provided with a number of shielding structure fracturing perforations along the length thereof and being attached to the perimeter edge of the electrical connection box by perforated attachments such that the break away shield structure is easily detached from the connection box once the sheet rock work has been completed by gripping the break away shielding structure with snips, pliers or the like and twisting to sequentially disconnect one or more portions of the break away shielding structure from the the perimeter edge of the electrical connection box.

BACKGROUND OF INVENTION

During construction, many electrical connection boxes, such as outlet and switch boxes, become filled with sheet rock mud compound by careless sheet rock workers. This causes the electricians to spend considerable amounts of time removing hardened sheet rock mud compound from electrical connection boxes prior to installing outlet fixtures and switches in the connection boxes. It would be a benefit, therefore, to have an electrical connection box that included a detachable shielding structure which would prevent the connection box from being filled with sheet rock mud compound during sheet rock construction and which could be rapidly and easily broken away from the connection box after the sheet rock construction had been completed with snips, pliers, or the like to allow the electricians to install outlet fixtures and switches within the connection box as needed and without the need for removing sheet rock mud compound from the interior of the electrical connection box.

SUMMARY OF INVENTION

It is thus an object of the invention to provide an improved electrical connection box having a break away shielding structure that extends out past the perimeter edge of the connection box that defines the open front of the connection box and operates prior to removal to prevent mudding over of the open front of the connection box during sheet rock construction; the break away shielding structure being provided with a number of shielding structure fracturing perforations along the length thereof and being attached to the perimeter edge of the electrical connection box by perforated attachments such that the break away shield structure is easily detached from the connection box once the sheet rock work has been completed by gripping the break away shielding structure with snips, pliers or the like and twisting to sequentially disconnect one or more portions of the break away shielding structure from the the perimeter edge of the electrical connection box.

Accordingly, an improved electrical connection box is provided. The an improved electrical connection box having a break away shielding structure that extends out past the perimeter edge of the connection box that defines the open front of the connection box and operates prior to removal to prevent mudding over of the open front of the connection box during sheet rock construction; the break away shielding structure being provided with a number of shielding structure fracturing perforations along the length thereof and being attached to the perimeter edge of the electrical connection box by perforated attachments such that the break away shield structure is easily detached from the connection box once the sheet rock work has been completed by gripping the break away shielding structure with snips, pliers or the like and twisting to sequentially disconnect one or more portions of the break away shielding structure from the the perimeter edge of the electrical connection box.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 3 shows the electrical outlet of FIG. 2 with the break away shield structure removed and broken into several pieces.

EXEMPLARY EMBODIMENTS

Figure 1:
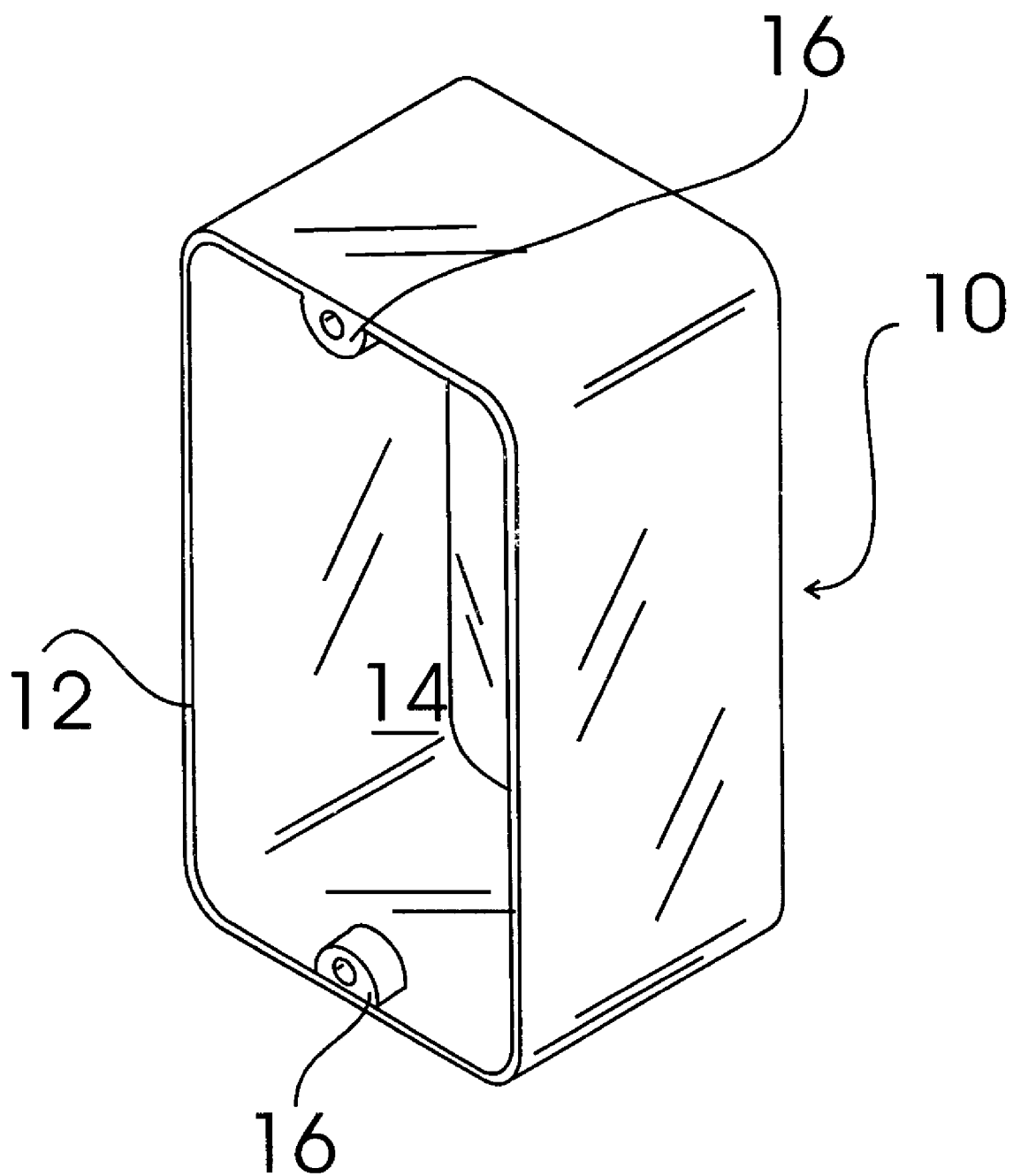
FIG. 1 shows a representative conventional electrical box showing the box edge defining a box front opening.

FIG. 1 shows a representative conventional electrical connection box, generally designated 10, including the perimeter edge 12 of the connection box 10 that defines the substantially rectangular open front 14 and the two switch/outlet fixture attachment apertures 16.

Figure 2:
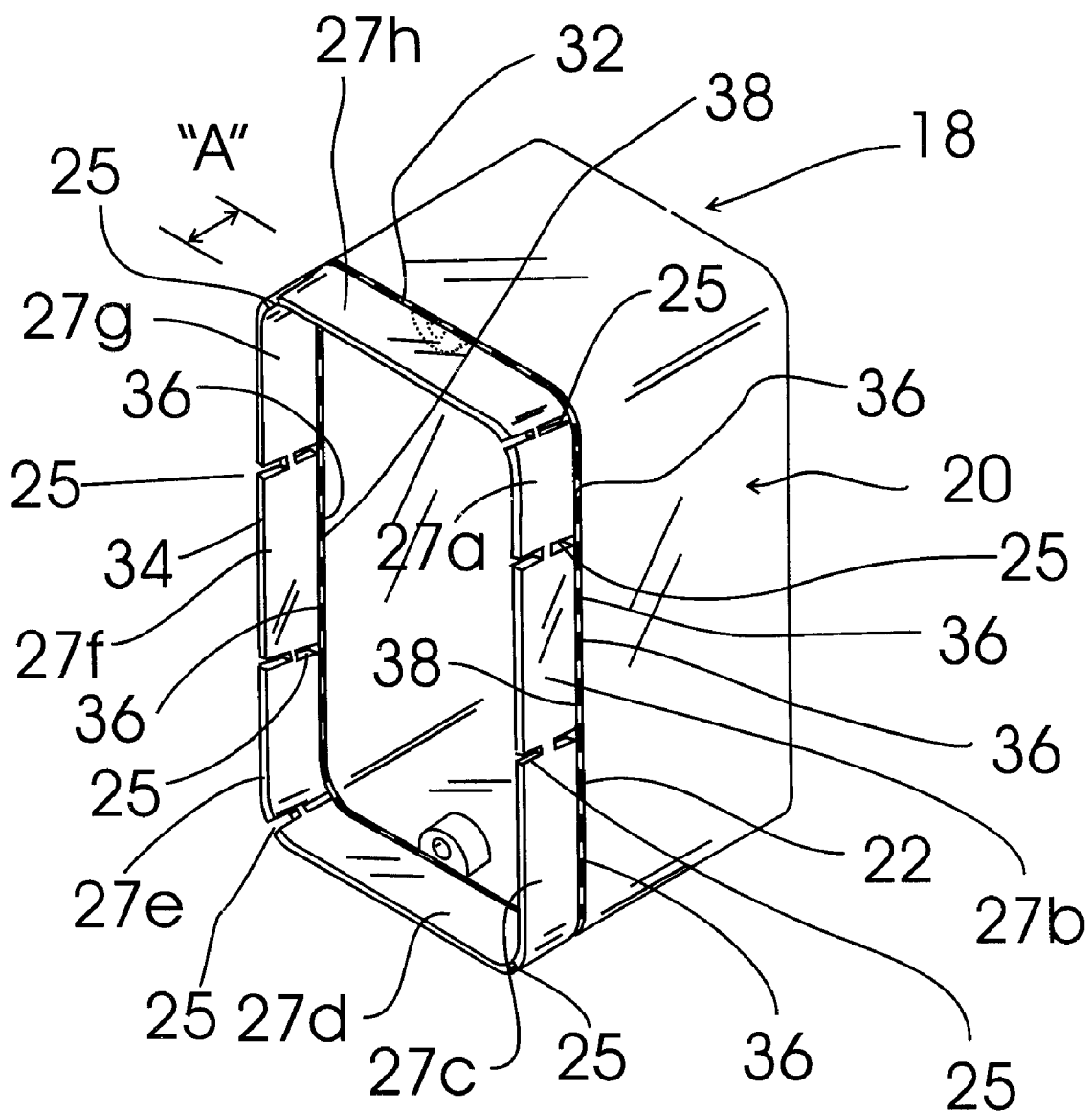
FIG. 2 shows an exemplary embodiment of an electrical connection box with the break away shield structure improvement of the present invention detachably attached to the box edge that defines the box front opening and having a number of shield structure perforations for allowing parts of the shield structure to be detached separately from the electrical connection box with snips, pliers, or other similar readily available electricians tool.

FIGS. 2 and 3 show an exemplary embodiment of the improved electrical connection box of the present invention, generally designated 18. Improved electrical connection box 18 is of molded construction and includes a connection box, generally designated 20, and a break away shielding structure, generally designated 22. In this embodiment, connection box 20 includes an open front 14a defined by a perimeter box edge 12a and two switch/outlet fixture attachment apertures 16a. Break away shield structure 22 includes a shield structure opening 30 that corresponds substantially with open front 14a and has a shielding width "A" of two inches between an inner shield edge 32 and an outer shield edge 34. Inner shield edge 32 and perimeter box edge 12a are detachably connected together by a number of integrally formed connecting tabs 36. Break away shield structure 22 is provided with a number of shielding structure fracturing perforations 25 along the length thereof which allow break away shielding structure 22 to be fractured into up to eight separate pieces 27a–h during detachment of break away shield structure 22 from perimeter box edge 12a by an electrician or the like gripping the break away shield structure 22 with a pair of snips, pliers, or similar tool and twisting of one or more portion 27a–h.

It can be seen from the preceding description that an electrical connection box has been provided.

It is noted that the embodiment of the electrical connection box described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. In an electrical connection box having a perimeter box edge that defines an open front of the electrical connection box the improvement comprising:

a break away shielding structure attached to and extending out past the perimeter box edge of the electrical connection box that defines the open front of the electrical connection box and operates prior to detachment from the perimeter box edge to prevent mudding over of the open front of the connection box during sheet rock construction;

the break away shielding structure being provided with a number of shielding structure fracturing perforations along the length thereof and being attached to the perimeter edge of the electrical connection box by perforated attachments such that the break away shielding structure is easily detached in separate pieces from the perimeter box edge of the electrical connection box once the sheet rock work has been completed by gripping portions of the break away shielding structure with snips, pliers or the like and twisting to sequentially disconnect one or more portions of the break away shielding structure from the perimeter box edge of the electrical connection box.

* * * * *